(No Model.)
A. WACKER.
MEASURING BOX.
No. 468,961. Patented Feb. 16, 1892.
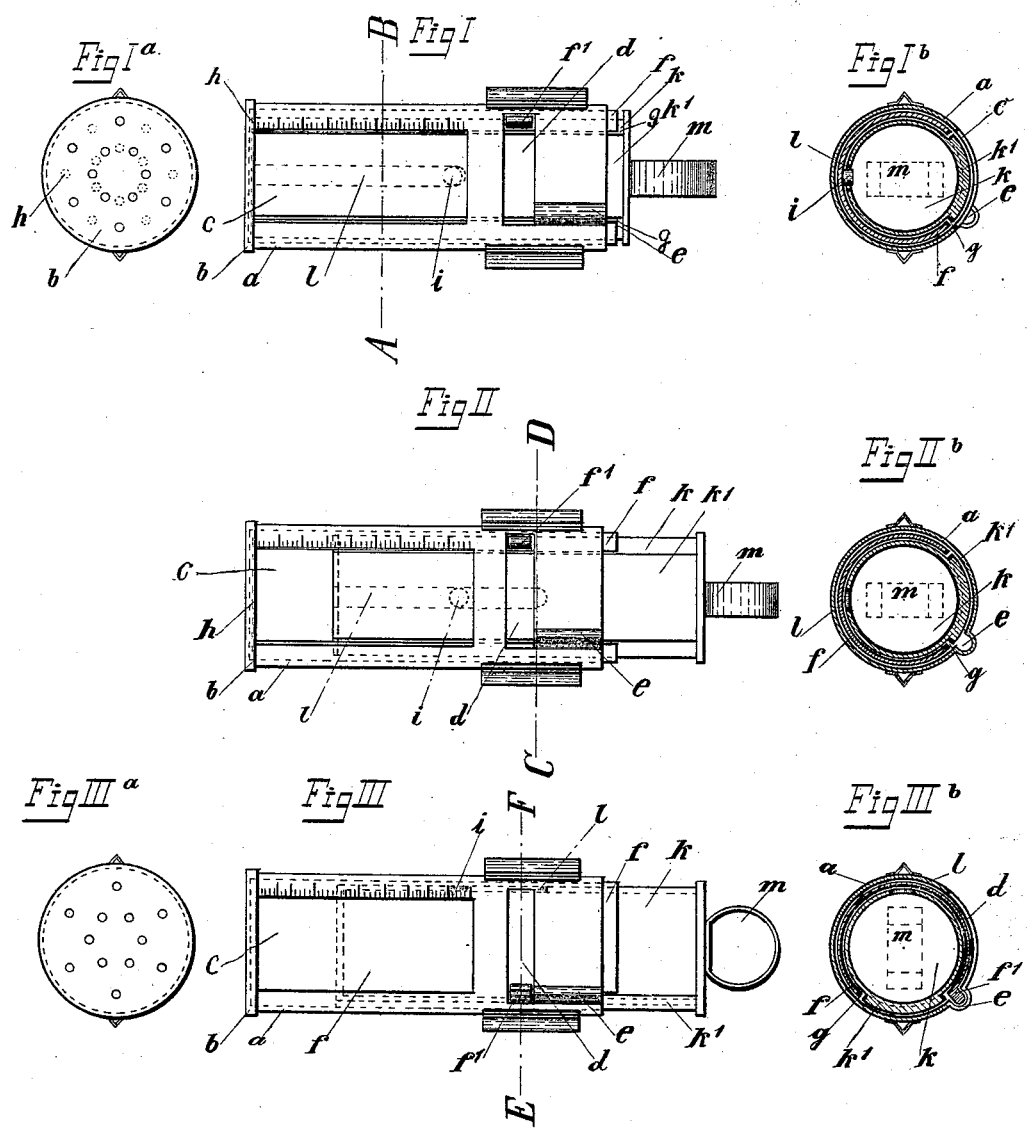
Witnesses:
Hermann Bormann
Thomas M. Smith
Inventor:
Albert Wacker
by J. Walter Douglass
att'y

UNITED STATES PATENT OFFICE.

ALBERT WACKER, OF NUREMBERG, GERMANY.

MEASURING-BOX.

SPECIFICATION forming part of Letters Patent No. 468,961, dated February 16, 1892.

Application filed April 22, 1891. Serial No. 390,071. (No model.)

*To all whom it may concern:*

Be it known that I, ALBERT WACKER, a subject of the Emperor of Germany, residing at Nuremberg, in the Kingdom of Bavaria and German Empire, have invented certain new and useful Improvements in Measuring-Boxes, of which the following is a specification.

The principal object of my invention is to provide a simple, compact, and comparatively inexpensive apparatus for measuring and distributing granular and powdered materials or substances.

My invention consists of a portable appliance or apparatus for measuring and distributing substances or materials constructed and arranged substantially in the manner hereinafter described, and pointed out in the claims.

The nature and particular characteristic features of my invention will be more fully understood from the following description, taken in connection with the accompanying drawings, forming part hereof, and in which—

Figure 1 is an elevation of a measuring apparatus embodying my invention in a closed position and comprising two cylinders and a measuring-slide having an operating-handle attached to said slide and a scale arranged along one edge of an aperture in the outer cylinder and also showing the means for maintaining the cylinders in alignment. Fig. 1$^a$ is an end view of the apparatus, showing the sieve or perforated ends of the cylinders adapted to permit of the distribution of the substance or material contained in the apparatus while the same is closed. Fig. 1$^b$ is a section on the line A B of Fig. 1, showing the two cylinders and slide and also the means for maintaining the same in alignment. Fig. 2 is an elevational view of said measuring appliance illustrated in Fig. 1, but with the slide partially withdrawn in order to permit of a material or substances being charged into the same to be measured. Fig. 2$^a$ is a section on the line C D of Fig. 2. Fig. 3 is an elevational view of said measuring apparatus, showing the slide partially withdrawn and with the inner cylinder turned so as to inclose or envelop the measured substance or materials therein. Fig. 3$^a$ is an end view similar to Fig. 1$^a$, but showing the distributing-apertures of the sieve or perforated ends of the cylinders in proper alignment with each other; and Fig. 3$^b$ is a section on the line E F of Fig. 3.

Referring now to the drawings for a further description of my invention, $a$ is the outer casing, open at one end and closed by a sieve $b$ at the other end. This casing $a$ is provided with an opening $c$ for admitting and discharging substances or materials to be measured and having one edge thereof divided off so as to form a scale, for a purpose to be presently more fully explained.

$d$ is a transverse slot, and $e$ is a hollow struck-up channel for the insertion of and for guiding a tongue or projection $f'$, secured to the inner cylinder $f$. This cylinder $f$ is open at one end and provided at the opposite end in a similar manner as the cylinder $a$ with a sieve or perforations $h$. A portion of the wall of this cylinder is cut away, as shown at $g$, and this opening conforms to and corresponds with the opening $c$ of the cylinder $a$ when the two cylinders $a$ and $f$ are in the position shown in Figs. 1 and 2.

$k$ is a hollow measuring-slide adapted to move longitudinally in the inner cylinder $f$ and provided with a thickened projection $k'$, fitting into the opening $g$ of the cylinder $f$ to constitute a guide for keeping the cylinder $f$ and measuring-slide $k$ at all times in alignment.

An additional guide and stop for the measuring-slide is provided by means of the pin $i$, secured into the inner cylinder $f$ and which engages in the slot $l$ of the slide $k$. This slot $l$ is of the same length as the opening $c$ of the casing $a$ and extends to the closed extremity of the slide $k$, so that when the latter is withdrawn from the cylinder $f$ to its full extent the pin $i$ contacts with the end wall of the slide $k$ and thus arrests the same.

$m$ is a handle attached to the slide $k$ for manipulating the same.

The mode of operation of the hereinbefore-described apparatus for measuring granular or powdered substances is as follows: The slide $k$ is drawn outward from the cylinder $f$ to provide a space of the length and volume desired, which may be readily ascertained from the scale arranged along the edge of the opening $c$ of the casing $a$. The substance or material is then introduced into the appliance by either dropping the same into the appliance or the appliance inserted into the substance or material to be measured, whereupon the slide $k$ and the cylinder $f$ are both turned within the casing $a$ by the operating-handle $m$ to remove superfluous material adhering around or about the device. This substance or material may then be discharged by returning the slide $k$ and the cylinder $f$ to their normal positions which they occupied before the filling of the same, as shown in Fig. 2. The substance or material is then removed through the opening $c$, or the apparatus may be used as a distributing device, as shown in Fig. 3 and Fig. 3$^a$, in which case the slide $k$ and inner cylinder $f$ are turned within the casing $a$, as hereinbefore described, so as to bring the perforated ends $b$ and $h$ of the cylinders $a$ and $f$ into alignment with each other.

It will be obvious to those skilled in the art to which my invention appertains that modifications may be made in the details of construction thereof without departing from the spirit of the invention. Hence I do not wish to be understood as limiting myself to the precise construction and arrangement of the parts of the appliance hereinbefore described, for

What I claim as new, and desire to secure by Letters Patent, is—

1. A measuring apparatus comprising a casing, a cylinder, and a slide, said casing provided with an aperture and a transverse slot and said cylinder provided with a corresponding opening, and a projection adapted to engage in the slot of said casing, substantially as and for the purposes set forth.

2. A measuring apparatus comprising a cylindrical casing provided with an opening therein and a transverse slot arranged adjacent thereto, a cylinder having an aperture in one end and an opening in the wall corresponding with that in said casing, a pin or projection adapted to engage in the slot of said casing, and a measuring-slide adapted to longitudinally move in said cylinder, substantially as and for the purposes set forth.

3. A measuring apparatus comprising a cylindrical casing having an opening at one end and an opening in the wall thereof, a scale arranged along one edge of said opening, a cylinder mounted in said casing and having an opening in the wall thereof, a pin and slotted connection between said casing and cylinder, the construction being such as to permit of the respective openings being brought into or out of alignment with each other, and a measuring-slide adapted to slide within said cylinder and afforded a range of movement to provide a space in said cylinder of a required volume or extent, substantially as and for the purposes set forth.

4. A measuring apparatus comprising a casing provided with an opening and a scale, a slotted cylinder adapted to be fitted into and to turn in said casing, a pin and slotted connection between said casing and cylinder, a measuring-slide having a handle, and a slot engaging with the pin of said cylinder to guide said slide longitudinally, substantially as and for the purposes set forth.

5. A measuring and distributing apparatus comprising a casing and a cylinder, each having one end open and perforated opposite ends, openings in the walls thereof, a measuring-slide mounted in said cylinder, and pin-and-slot connections between said casing and cylinder and the said cylinder and measuring-slide, substantially as and for the purposes set forth.

6. A measuring and distributing apparatus comprising a casing and a rotatable cylinder, each having a perforated end and an opening in the wall thereof, a slide provided with a handle and adapted to be moved longitudinally within said cylinder to afford a space of a required volume and extent within said cylinder, and a pin-and-slot connection between said casing and cylinder, substantially as and for the purposes set forth.

7. A measuring and distributing apparatus comprising an outer casing having a perforated end, an opening in the wall thereof, and a scale arranged along the edge of said opening, a rotatable cylinder having a perforated end and an opening in the wall thereof and mounted within said casing, a pin-and-slot connection between said casing and opening to limit the extent of movement of said cylinder within said casing, and a cylindrical slide closed at both extremities and having a handle attached thereto, a pin-and-slot connection, and a guideway on the peripheral surface thereof to engage with the opening of said cylinder and to afford said slide a range of longitudinal movement within said cylinder, substantially as and for the purposes set forth.

In witness whereof I have hereunto set my hand in presence of two witnesses.

ALBERT WACKER.

Witnesses:
W. BINDEWALD,
A. HOELDER.